Jan. 23, 1968 E. F. ANDERSEN 3,364,890

CONTAINER CLOSURE AND METHOD OF MAKING THE SAME

Filed Feb. 12, 1965 2 Sheets-Sheet 1

INVENTOR:
ELI FRANK ANDERSEN
BY Howson & Howson
ATTYS.

Jan. 23, 1968 E. F. ANDERSEN 3,364,890
CONTAINER CLOSURE AND METHOD OF MAKING THE SAME
Filed Feb. 12, 1965 2 Sheets-Sheet 2
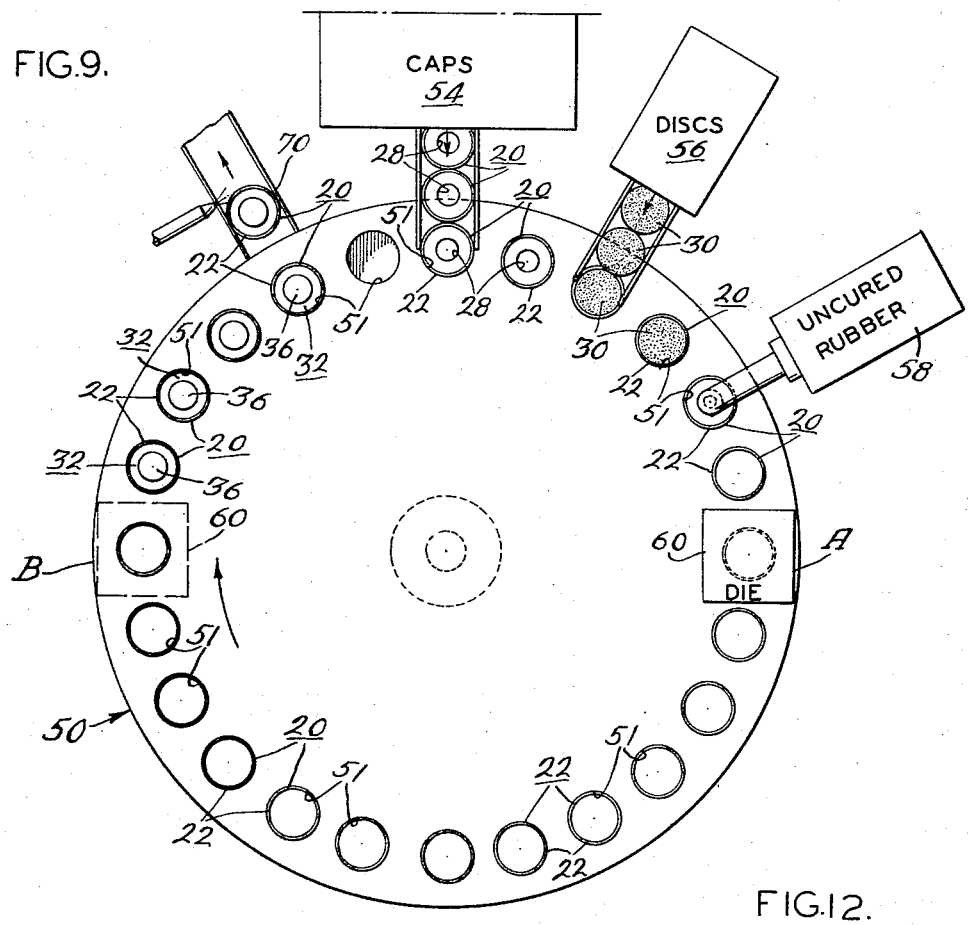
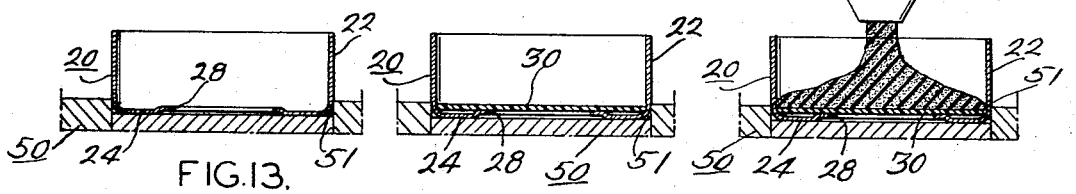
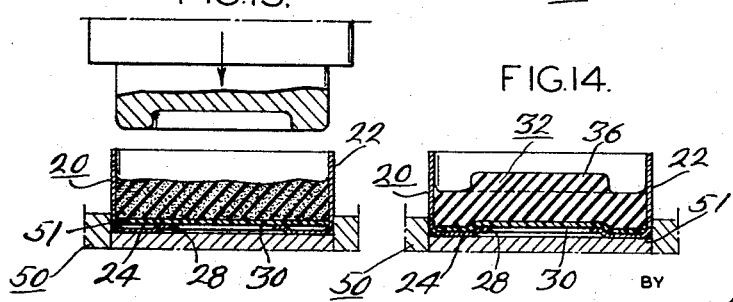
INVENTOR:
ELI FRANK ANDERSEN
BY Howson & Howson
ATTYS.

United States Patent Office 3,364,890
Patented Jan. 23, 1968

3,364,890
CONTAINER CLOSURE AND METHOD OF MAKING THE SAME
Eli Frank Andersen, Devon, Pa., assignor to The West Company, Phoenixville, Pa., a corporation of Pennsylvania
Filed Feb. 12, 1965, Ser. No. 432,230
3 Claims. (Cl. 113—121)

ABSTRACT OF THE DISCLOSURE

A tamperproof closure for pharmaceutical bottles or the like comprising a cap having a generally cylindrical skirt and a top consisting of an annular portion, the inner edge of which defines a circular opening and an integral liner-stopper assembly secured interiorly of the cap. The liner is preferably made of a plastic material such as polytetrafluoroethylene and the stopper is made of rubber so that upon assembly there is a breakable bond between the liner and stopper whereby insertion of a hypodermic needle through the liner and stopper to withdraw the contents breaks the bond between the liner and stopper and gives a visual indication that the liner-stopper has been pierced. The liner-stopper assembly is formed integrally with the cap by inserting a disc-like liner interiorly of the cap and then depositing a predetermined amount of uncured rubber in the cap over the liner and then applying heat and pressure to cure the rubber and form it in the shape of a stopper whereby the stopper is adhered to the liner to provide the temporary limited bond and the stopper is adhered to the skirt of the cap to provide an integral one-piece assembly.

This invention relates to an improvement in closures for containers and to a novel, highly economical method for making these closures.

The present invention has particular application to closures for pharmaceutical containers or bottles. Some of these closures typically comprise an outer cup-like cap member of sheet metal such as aluminum having a cylindrical skirt and a top comprising an outer annular portion and an inner removable disc portion disposed centrally of the annular portion and detachably connected thereto by fracturable means, in the form of bridges. These caps usually are applied over the open end of a container and hold a disc or stopper formed of rubber or like material in place over the top of the bottle. Thus, when the user desires to use the contents of the bottle, the central disc portion is removed by inserting a fingernail beneath the disc to pry it upwardly thereby fracturing the bridge connections and thereby exposing the rubber stopper which then may be pierced by a hypodermic syringe.

In the process of making a closure of the type described above, the outer cup-like cap member is usually stamped or otherwise formed from thin gauge sheet metal such as aluminum and the stoppers which are conventionally made of rubber are usually made in a separate molding operation. In the molding operation, usually a plurality of stoppers are formed integrally on a sheet of rubber and then stripped or cut out from the sheet. The individual stoppers are then assembled manually to a cap by placing them inside the cap and thereafter spinning or otherwise forming a radially inwardly directed rim or rib on the skirt of the cap to hold the stopper in the cap. Thereafter, the cap and stopper are applied to filled containers by crimping the lower terminal edge of the skirt of the cap under a shoulder on the exterior neck portion of the bottle. It has been found that this method of assembling closures comprising caps and stoppers is time consuming, wasteful and costly. For example, the various assembly operations such as separate molding of the stoppers, cutting the stoppers from the sheet, manual positioning or insertion of the stoppers into the caps and the rolling of the cap to hold the stopper in the cap all add up to a time-consuming operation. Further, there is a certain amount of waste incident to cutting the stoppers from a sheet. Additionally, it has been found that in some instances, before assembly of the closure on bottles, the connecting bridges have been broken in tumbling about during production and transportation.

The present invention provides a novel and improved method for making closures for containers which is faster and more economical than the prior method discussed above, one in which the closure including the cap and stopper may be made in a completely automated system. In accordance with the present invention, a metal cap having a generally cylindrical skirt and an annular top portion with a central opening is first formed by suitable means and thereafter a circular liner is positioned interiorly of the cap, the liner being approximately equal to the diameter of the side wall of the cap so that it fits snugly therein. The liner may be made of a resilient plastic material such as, for example, polytetrafluoroethylene, sold under the trade name Teflon by the E. I. du Pont de Nemours & Company. Thereafter, a predetermined amount of material for forming the stopper, for example, uncured rubber is placed into the cap on top of the liner and then by suitable application of heat and pressure the rubber is cured and the stopper formed to a suitable desired shape. It is noted that in this latter operation, the stopper is bonded to the liner and snugly engages against the skirt of the cap to form in effect a one-piece closure. After the closure is finished, it is suitable for application to a bottle simply by placing it over the neck of the bottle and crimping the lower terminal edge of the skirt over an annular shoulder on the exterior neck portion of the bottle.

Clearly the present method of making a closure is much simpler than the prior method discussed above. As discussed in more detail hereafter, the entire operation of assembling a cap and a stopper may be done completely automatically without any hand operations. In addition, several operations such as the blanking of the stoppers and manual assembly thereof to the cap and the rolling of the skirt to retain the stopper in place have been eliminated. Further, by the present method waste incident to separate formation of the stopper is eliminated.

Moreover the principal embodiment of the invention discussed above is effectively a one-piece unit comprising an outer cap and a stopper, is truly tamper proof, and is of a much more simplified construction. For example, the Teflon liner has a translucent characteristic and when it is bonded to the rubber stopper, the portion of the liner exposed through the central opening of the cap presents a distinguishing color effect, such as red when the stopper is made of a red rubber. Now, when the liner and stopper are pierced by a hypodermic syringe, the bond or union between the Teflon and rubber in the exposed circular area is broken and this breaking of the bond manifests a color change. Thus, the closure is truly tamper proof in that the user may observe when the seal has been once broken.

With the foregoing in mind, an object of the present invention is to provide a novel and improved method for making closures for containers in a highly economical manner and one which lends itself to production type methods without manual handling operations.

Another object of the present invention is to provide a novel method for making closures for containers especially for pharmaceutical purposes which is truly tamper proof.

A further object of the present invention is to provide a tamper-proof closure which is of simplified construction and which is easy and economical to manufacture.

The foregoing and other objects of the present invention and the various details of the construction of a container closure and the method of making the same are hereinafter more fully set forth and described with reference to the accompanying drawings, in which:

FIG. 9 is a schematic plan view illustrating stepwise the method of making a tamper-proof closure in accordance with the present invention; and FIGS. 10–14 are sequential views showing the various steps in the method of making a tamper-proof closure in accordance with the present invention.

Figure 1:
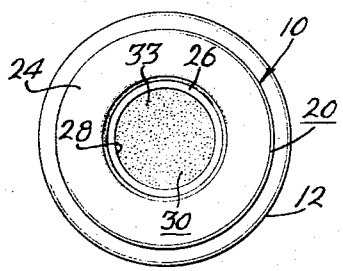
FIG. 1 is a plan view of a container closure in accordance with the present invention.
Figure 2:
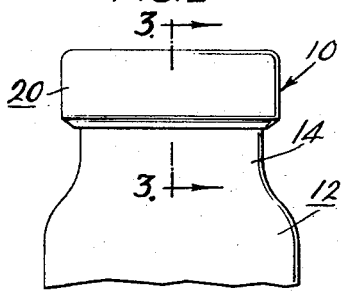
FIG. 2 is a side elevational view of a container closure secured in position on a bottle.

Referring now to the drawings and particularly to FIGS. 1–6 thereof, there is illustrated one embodiment of a container closure in accordance with the present invention generally designated by the numeral 10 applied to a container or bottle 12 of conventional form, a portion of which is shown in FIG. 2. The bottle, as illustrated, has a reduced neck 14 and a radially outwardly projecting shoulder 16 adjacent the open end thereof.

Figure 3:
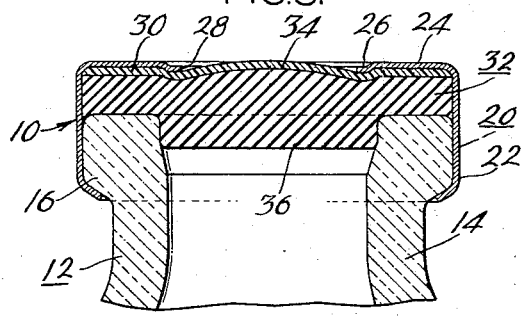
FIG. 3 is an enlarged sectional view taken on lines 3—3 of FIG. 2.
Figure 4:
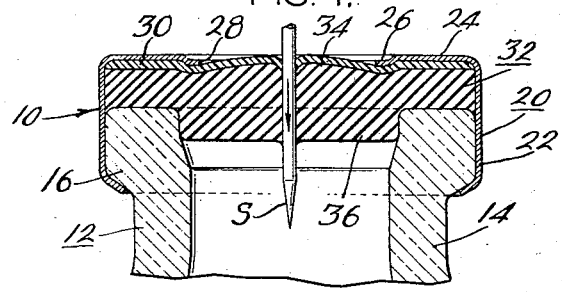
FIG. 4 is a sectional view similar to FIG. 3 showing the closure being pierced by a hypodermic syringe.
Figure 5:
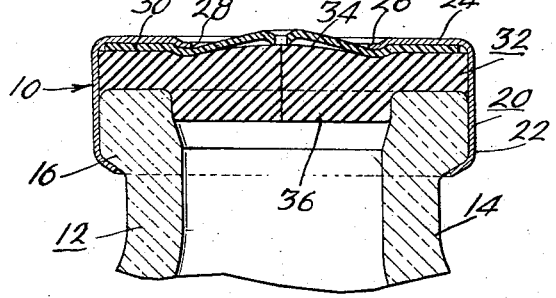
FIG. 5 is a sectional view similar to FIG. 4 after the closure has been pierced.

The container closure 10 comprises, as illustrated, an outer cap member 20 of generally cup-like form having a generally cylindrical side wall or skirt 22 and a top including an outer annular portion 24 terminating in a downwardly directed rim 26 defining a central circular opening 28. The closure 10 further includes a liner 30 interiorly of the cap 20 which in the present instance is of circular shape and of a size to snugly engage in the cap. The liner 20 seats against the interior face of the annular portion 24 so that a central circular portion of the liner is exposed through the opening 28 in the top of the cap. The liner 20 is preferably made of a plastic material, for example, polytetrafluoroethylene sold under the trade name Teflon by E. I. du Pont de Nemours & Company. A stopper 32 has a top face 34 confronting and bonded to the liner 30 and a depending plug portion 36 which engages interiorly of the opening in the bottle when the closure is assembled to a bottle as illustrated in FIGS. 3, 4 and 5. The stopper 32 is preferably made of a resilient, deformable material such as natural or synthetic rubber, but may be made of other deformable materials such as plastic.

Figure 6:
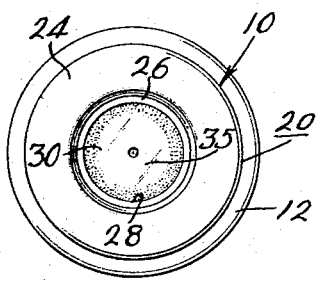
FIG. 6 is a plan view of the closure after having been pierced.

Accordingly, in assembling the closure 10 to a bottle 12, the closure is merely positioned over the open end of the bottle with the plug portion 36 engaging in the opening therein as shown in FIGS. 3 and 4. The skirt 22 of the closure 10 initially is straight and after application to the bottle, the lower terminal edge of the skirt 22 is crimped or bent inward to engage under the shoulder 16 to hold the closure in place. It is noted that since the Teflon liner 30 has a translucent characteristic, if the stopper 32 is made of a rubber having a distinguishing color such as red or black, the portion of the liner 30 exposed through the opening 28 of the cap presents when the liner is bonded to the rubber, the distinguishing color effect of the stopper as indicated by the shaded area 33 in FIG. 1. Now when it is desired to use the contents of the bottle, the user merely pierces the liner 30 and stopper 32 with a syringe S to withdraw the contents of the bottle and then retracts the syringe. When the syringe S is inserted and withdrawn, the effect is to break the bond between the liner 30 and the stopper 32 in a given area surrounding the point of puncture as at 35 in FIG. 6. This breaking of the bond results in a color change to the eye of the user. For example, if the stopper 32 is made of a red rubber, the appearance of the liner prior to being pierced as at 33 in FIG. 1 is a dull red. After piercing and breaking of the bond, the area 35 in FIG. 6 is a much lighter shade of red, almost pink. By this arrangement, the closure is truly tamper proof since the user has a visual means for determining when the stopper has been pierced.

Another important feature of the present invention is the provision of a very simple and economical method for making a tamper-proof closure for containers. To this end, in accordance with the present invention the cap 20 of cup-like form having the annular top portion 24 with the opening 28 therein and the depending generally cylindrical skirt 22 is formed by conventional stamping means. Thereafter, the liner 30, preferably made of Teflon and of a suitable thickness to be pierced readily by a syringe, is then placed inside of the cap 20 so that it overlies the opening 28 therein as illustrated in FIG. 11. The liner 30 is preferably of circular shape and of a diameter slightly less than the diameter of the skirt 22 to fit snugly in the cap. A predetermined amount of resilient material, in the present instance uncured rubber which may be in the form of a disc or pellet, is then deposited on top of the liner 30 as illustrated in FIG. 12. Heat and pressure are then applied to the uncured rubber to vulcanize the same and form it into the desired shape of the stopper 32 as illustrated in FIG. 14. It is noted that even though the stopper 32 illustrated is the type having a depending plug portion which engages in the opening of a container, any other desired shape may also be formed in this operation. By application of heat and pressure a bond is created between the confronting engaging faces of the stopper 32 and the liner 30. Also, during application of pressure the circumferential side wall of the stopper 32 is pressed against the skirt 22 so that the stopper 32 and liner 30 are retained snugly in the cap thereby providing in effect a one-piece unit.

There is illustrated schematically in FIG. 9 a completely automated system for carrying out the method of making closures in accordance with the present invention. As illustrated, the system includes a rotating turret 50 having a plurality of circumferentially spaced pockets 51 adjacent its outer peripheral edge to receive and support the cap member 20.

A cap supply station 54 is provided adjacent the turret 50 to supply inverted caps one at a time to the pockets 51. As the turret moves the caps, in the present instance, in a clockwise direction, they pass a disc supply station 56 wherein again suitable apparatus is provided for discharging one disc or liner at a time interiorly of the caps. A predetermined amount of a resilient, deformable material, in the present instance, uncured rubber is deposited on top of the liner at a rubber supply station 58. Thereafter, suitable mechanism for applying heat and pressure, for example, a heated die 60 engages interiorly of the caps for a predetermined length of time between the points A and B to cure the rubber and provide the bond between the stopper 32 and the liner 30. The mechanism may comprise a plurality of dies mounted for movement in an endless path, one die engaging in each of the caps at the point A and dwelling in the cap to the point B. At the point B the die mechanism disengages the finished articles and they continue to a discharge station 70 where suitable cooling means may be provided to cool the finished articles.

From the foregoing it may be seen that the present invention provides an extremely simplified and highly economical method for making container closures. The entire assembly operation may be carried out completely automatically without any manual handling. As compared with prior methods for assembling closures of this type, it may be seen that several prior operations, such as the blanking or cutting out of the stoppers, manual assembly of the stoppers to the cap and the rolling of the skirt to retain the stopper in place have been eliminated. Also scrap produced during stripping of the stopper is eliminated.

Figure 7:
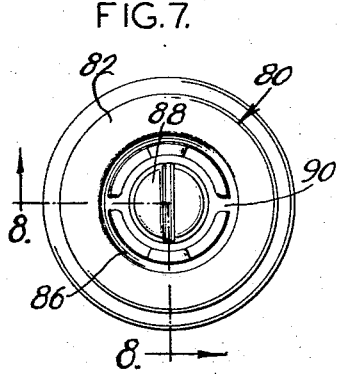
FIG. 7 is a plan view of still another form of container closure in accordance with the present invention.
Figure 8:
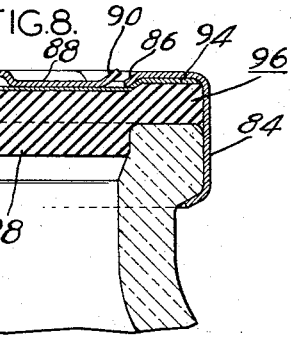
FIG. 8 is an enlarged sectional view taken on lines 8—8 of FIG. 7.

There is shown in FIGS. 7 and 8 another form of closure in accordance with the present invention which may also be made by the method described above. The closure is very similar to that described previously and includes an outer cap 80 having an outer annular top portion 82 and a generally cylindrical skirt 84 depending from the outer annular top portion 82, the lower terminal edge of which is adapted to be crimped or spun under a shoulder 81 adjacent the open end of the container. In the present instance, the outer annular portion 82 terminates in a downwardly projecting rim 86 and the cap includes a central disc 88 which is connected to the rim 86 by fracturable bridge means 90. The cap has a pair of diametrically opposed upturned edge portions 92, which may be engaged by the fingernail of the user or another implement to pry the disc 88 upwardly and fracture the bridge means 90. The closure further includes a liner 94 of generally circular form which is disposed interiorly of the cap and confronts the top and disc portion thereof. Below the liner and bonded thereto is a stopper 96 made, for example, of rubber having in the present instance a depending plug 98 to engage in the opening in the container.

In the present instance, the cap is tamper proof by reason of the removable disc portion which, of course, when broken away, is evidence that the container has been used. In view of this, the liner 94 need not be made of Teflon, but may be of a material suitable to prevent leakage of the rubber through the top of the cap during the formation of the stopper.

This closure shown in FIGS. 7 and 8 is adapted to be made by substantially the same method as that outlined above. Thus, with reference to the system shown in FIG. 9, the caps 80 may be fed one at a time to the pockets 51 on the periphery of the turret during rotation thereof. Then, as the caps 80 are moved past the disc or liner supply station, one liner is placed in each of the caps. Downstream of the liner supply station 56 a suitable, predetermined quantity of resilient material such as rubber is deposited on top of the liner. Thereafter, suitable mechanism for applying heat and pressure engages the assembly between the points A and B. Finally the finished caps are discharged as at 70.

From the foregoing it is apparent that the present invention provides an improved container closure especially useful for pharmaceutical bottles which is truly a tamper-proof construction. The present invention further provides a highly simplified, very economical method for making the same.

While a particular embodiment of the present invention has been illustrated and described herein, it is not intended to limit the invention to such disclosure and changes and modifications may be made therein within the scope of the following claims.

What is claimed is:

1. A method of making a closure for a container consisting of the steps of forming a cap of cup-like form having an annular top with a central opening therein and a cylindrical skirt depending from the top, positioning a circular liner made of a plastic material in the cap to overlie at least the opening in the top, depositing a predetermined amount of uncured rubber in the cap over the liner, applying heat and pressure to cure the rubber and form it in the shape of a stopper whereby the stopper is adhered to the liner with a temporary breakable bond and the stopper and liner are retained in the cap to provide an integral assembly.

2. A method of making a closure for a container consisting of the steps of forming a metallic cap of cup-like form having a top consisting of an outer annular portion, a disc connected to the outer annular portion by fracturable bridge means and a skirt depending from the annular portion, positioning a liner made of a plastic material interiorly of the cap confronting the inside of the top, placing a predetermined amount of a deformable material in the cap and forming the deformable material to provide a stopper having a breakable bond with the plastic liner and secured to the skirt to provide an integral assembly.

3. A method of making a closure for a container consisting of the steps of forming a cap of cup-like form having an annular top with a central opening therein and a cylindrical skirt depending from the top, positioning a circular liner made of a fluoroethylene polymer in the interior of the cap to overlie the opening in the top, depositing a predetermined amount of uncured rubber in the cap over the liner, applying heat and pressure to cure the rubber and form it into the shape of the stopper and to produce a bond between the skirt and stopper providing an integral one-piece assembly, said application of heat and pressure also creating a limited bond between the liner and stopper which is broken upon insertion of a hypodermic needle therethrough thereby to give a visual indication thereof and hence providing a truly tamper-proof construction.

References Cited

UNITED STATES PATENTS

| 1,091,626 | 3/1914 | Butkus | 113—80 |
| 1,170,152 | 2/1916 | Heath | 113—121 |
| 2,543,775 | 3/1951 | Gora | 113—121 |
| 3,001,657 | 9/1961 | Gamble | 113—121 |

CHARLES W. LANHAM, *Primary Examiner.*

R. D. GREFE, *Examiner.*